United States Patent
Okawa et al.

(10) Patent No.: US 10,254,187 B2
(45) Date of Patent: Apr. 9, 2019

(54) WATERPROOF PRESSURE SENSOR, AND MANUFACTURING METHOD AND SENSOR CONVEYANCE BODY FOR MANUFACTURING WATERPROOF PRESSURE

(71) Applicant: Alps Electric Co., Ltd., Ota-ku, Tokyo (JP)

(72) Inventors: Hisanobu Okawa, Miyagi-ken (JP); Eiji Umetsu, Miyagi-ken (JP); Hideki Kamimura, Miyagi-ken (JP)

(73) Assignee: ALPS ALPINE CO., LTD., Tokyo (JP)

( * ) Notice: Subject to any disclaimer, the term of this patent is extended or adjusted under 35 U.S.C. 154(b) by 342 days.

(21) Appl. No.: 15/392,968

(22) Filed: Dec. 28, 2016

(65) Prior Publication Data
US 2017/0284885 A1    Oct. 5, 2017

(30) Foreign Application Priority Data
Mar. 30, 2016   (JP) .................. 2016-068857

(51) Int. Cl.
*G01L 19/00*   (2006.01)
(52) U.S. Cl.
CPC .................. *G01L 19/0038* (2013.01)
(58) Field of Classification Search
CPC ... G01L 19/147; G01L 9/0042; G01L 9/0072; G01L 13/025; G01L 19/04; G01L 9/0054; G01L 9/0075; G01L 19/0038; G01L 19/0084; G01L 19/14; G01L 19/069; G01L 19/0618; G01L 19/0645; G01L 9/0055; G01L 9/0073; G01L 19/0092; G01L 19/143; G01L 9/0051; G01L 9/0052; G01L 11/025; G01L 19/0007; G01L 19/0046; G01L 19/06; G01L 19/0627; G01L 19/0681; G01L 9/00; G01L 9/0041; G01L 9/0044; G01L 11/04; G01L 19/0023; G01L 19/0672; G01L 19/069;
(Continued)

(56) References Cited

U.S. PATENT DOCUMENTS

2002/0180019 A1    12/2002 Saito et al.
2015/0292973 A1*   10/2015 Ding .................. G01L 9/0054
                                        73/706
(Continued)

FOREIGN PATENT DOCUMENTS

JP   2002-372473   12/2002
JP   2006-220456    8/2006

*Primary Examiner* — Andre J Allen
(74) *Attorney, Agent, or Firm* — Beyer Law Group LLP

(57) ABSTRACT

A waterproof pressure sensor includes a pressure detection element, a cavity package configured to be provided with a recess in which the pressure detection element is mounted and an edge provided around the recess, a frame configured to be attached to the edge of the cavity package and has a surface more smoothed than the edge and an opening, a contact prevention member configured to be attached to the frame, and a pressure introducing hole having a diameter smaller than a diameter of the opening at a position overlapping the opening, and a gel agent configured to be provided in the recess and the opening, in which the gel agent is provided to be separated from an edge of the pressure introducing hole on the frame side.

12 Claims, 8 Drawing Sheets

(58) Field of Classification Search
CPC ..... G01L 19/142; G01L 19/16; G01L 27/002; G01L 7/00; G01L 7/163; G01L 7/166; G01L 9/0047; G01L 11/02; G01L 13/00; G01L 15/00; G01L 19/0609; G01L 19/083; G01L 19/10; G01L 19/148; G01L 7/08; G01L 9/0045; G01L 9/0048; G01L 9/006; G01L 9/007; G01L 9/0076; G01L 9/045; G01L 9/06; G01L 9/065; G01L 9/12; G01L 9/125; G01L 11/00; G01L 17/00; G01L 19/00; G01L 19/0015; G01L 19/003; G01L 19/0076; G01L 19/02; G01L 19/08; G01L 19/141; G01L 19/145; G01L 19/146; G01L 1/142; G01L 1/2262; G01L 1/246; G01L 21/12; G01L 23/16; G01L 27/005; G01L 27/007; G01L 7/04; G01L 7/063; G01L 7/082; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/04; G01L 9/08; G01L 9/085; G01L 9/105; G01L 9/14; G01L 9/16

See application file for complete search history.

(56) References Cited

U.S. PATENT DOCUMENTS

| | | | | |
|---|---|---|---|---|
| 2017/0030789 A1* | 2/2017 | Okawa | ............... | G01L 9/0051 |
| 2017/0234754 A1* | 8/2017 | Tanaka | ............... | G01L 19/14 |
| | | | | 73/706 |
| 2017/0284885 A1* | 10/2017 | Okawa | ............... | G01L 19/0038 |
| 2017/0284886 A1* | 10/2017 | Okawa | ............... | G01L 19/0645 |
| 2017/0292863 A1* | 10/2017 | Umetsu | ............... | G01D 11/245 |
| 2017/0345949 A1* | 11/2017 | Tomita | ............... | G01L 9/00 |
| 2018/0226564 A1* | 8/2018 | Itayama | ............... | B06B 1/0629 |
| 2018/0364126 A1* | 12/2018 | Na | ............... | G01L 19/0654 |

* cited by examiner

WATERPROOF PRESSURE SENSOR, AND MANUFACTURING METHOD AND SENSOR CONVEYANCE BODY FOR MANUFACTURING WATERPROOF PRESSURE

CLAIM OF PRIORITY

This application claims benefit of Japanese Patent Application No. 2016-068857 filed on Mar. 30, 2016, which is hereby incorporated by reference.

BACKGROUND OF THE INVENTION

1. Field of the Invention

The present invention relates to a waterproof pressure sensor, and a manufacturing method and a conveyance body for the waterproof pressure sensor, and particularly to a waterproof pressure sensor in which a pressure detection element is covered with a gel agent, and a manufacturing method and a conveyance body for the waterproof pressure sensor.

2. Description of the Related Art

In order to cause a pressure sensor to have a waterproof function, a pressure detection element is required to be covered with a soft resin such as gel. The resin climbs up a wall surface during curing, and there is a problem in that the resin protrudes to the outside and entrapment of air bubbles occurs at the time of coating.

Japanese Unexamined Patent Application Publication No. 2006-220456 discloses a relative pressure type pressure sensor in which a back side of a sensor chip is sealed with a gel member. In the pressure sensor, a pressure introducing hole is provided with a chip back side gel member for sealing the back side of the sensor chip. The chip back side gel member has a two-layer structure in which a hard gel covers a soft gel.

However, in the pressure sensor disclosed in Japanese Unexamined Patent Application Publication No. 2006-220456, when the gel with the two-layer structure is formed, two kinds of liquid agents are repeatedly coated before curing, and thus it is hard to form a stable upper gel. The two kinds of liquid agents are used, and this increases the number of manufacturing steps or cost. The hard gel is less likely to climb up a wall surface than the soft gel, but climbs up when the liquid agent is cured, and thus is not suitable for miniaturization, especially, reduction in height. If the gel agent protrudes to the outside of a package, the gel agent comes into contact with to a film when the pressure sensor is stored in an embossed tape, or the gel agent is adhered to the film when the pressure sensor is extracted therefrom, and thus handling thereof is hindered.

SUMMARY OF THE INVENTION

The present invention provides a waterproof pressure sensor, a manufacturing method and a conveyance body for the waterproof pressure sensor, capable of preventing protrusion of a gel agent and simplifying manufacturing steps.

According to an aspect of the present invention, there is provided a waterproof pressure sensor including a pressure detection element; a cavity package configured to be provided with a recess in which the pressure detection element is mounted and an edge provided around the recess; a frame configured to be attached to the edge of the cavity package and has a surface more smoothed than the edge and an opening; a contact prevention member configured to be attached to the frame, and a pressure introducing hole having a diameter smaller than a diameter of the opening at a position overlapping the opening; and a gel agent configured to be provided in the recess and the opening, in which the gel agent is provided to be separated from an edge of the pressure introducing hole on the frame side.

According to the configuration, since the gel agent provided in the recess does not protrude to the outside of the pressure introducing hole, the gel agent in the recess is prevented from coming into contact with members (for example, a cover film used together with an embossed tape accommodating the waterproof pressure sensor) other than the waterproof pressure sensor. In other words, it is possible to reliably accommodate the gel agent in the recess even without using two kinds of gel agents having differing hardness as disclosed in Japanese Unexamined Patent Application Publication No. 2006-220456.

In the waterproof pressure sensor according to the aspect of the present invention, a shape of the opening in a plan view may be a polygonal shape or a circular shape. Consequently, when a liquid agent serving as the gel agent is injected from the opening, the liquid agent radially spreads from an injection position in the recess, and thus entrapment of air can be prevented.

In the waterproof pressure sensor according to the aspect of the present invention, an outer shape of the opening in a plan view is located outside a vertex of a loop of a bonding wire connected to a component mounted in the recess. Consequently, it is possible to prevent interference between the loop of the bonding wire and the frame and thus to realize a reduction in height.

In the waterproof pressure sensor according to the aspect of the present invention, an extension direction of the bonding wire in a plan view may be a direction which is not orthogonal to a radial direction from the center of the opening. Consequently, when a liquid agent serving as the gel agent is injected from the opening, the liquid agent easily flows along the bonding wire, and thus it is possible to prevent entrapment of air.

In the waterproof pressure sensor according to the aspect of the present invention, a material of the cavity package may be ceramics. Consequently, a rough surface of a ceramic can be covered by the frame.

According to the aspect of the present invention, the waterproof pressure sensor may further include a circuit element configured to be connected to the pressure detection element, and the pressure detection element may overlap the circuit element. Consequently, it is possible to miniaturize the waterproof pressure sensor.

According to the aspect of the present invention, the waterproof pressure sensor may be individually accommodated in each of a plurality of depressions of a conveyance body, the conveyance body formed of a first member having the plurality of depressions arranged in a length direction and a second member bonded to the first member so as to be peeled off therefrom and covering the depressions. According to the configuration, since the gel agent is not adhered to a surface of the waterproof pressure sensor, the waterproof pressure sensor is easily placed on or extracted from the depression, or is handled well when the second member is peeled off.

According to another aspect of the present invention, there is provided a method of manufacturing a waterproof pressure sensor, including a step of mounting a pressure detection element in a recess of a cavity package provided with the recess and an edge on a periphery of the recess; a step of attaching a frame to the edge of the cavity package, the frame having a surface more smoothed than the edge and an opening; a step of injecting a liquid agent into the recess and the frame from the opening so as to gel the liquid agent; and a step of attaching a contact prevention member provided with a pressure introducing hole to the frame, the pressure introducing hole having a diameter smaller than a diameter of the opening.

According to the configuration, the frame is attached to the edge of the cavity package in which the pressure detection element is mounted, a liquid agent is injected from the opening of the frame into the recess so as to be gelled, and thus the pressure detection element can be covered with the gel agent. Subsequently, the contact prevention member is attached to the frame, and thus the gel agent in the recess is prevented from coming into contact with members (for example, a cover film used together with an embossed tape accommodating the waterproof pressure sensor) other than the waterproof pressure sensor.

According to the aspect of the present invention, in the method of manufacturing a waterproof pressure sensor, when the liquid agent is injected from the opening, the liquid agent may be injected from the center of the opening into the recess. Consequently, when a liquid agent serving as the gel agent is injected from the opening, the liquid agent radially spreads from an injection position in the recess, and thus entrapment of air can be prevented.

According to still another aspect, there is provided a conveyance body including a first member having a plurality of depressions arranged in a length direction; the waterproof pressure sensor disposed in each of the depressions; and a second member bonded to the first member so as to be peeled off therefrom and covering the depressions. According to the configuration, since the gel agent is not adhered to a surface of the waterproof pressure sensor, the waterproof pressure sensor is easily placed on or extracted from the depression, or is handled well when the second member is peeled off.

According to the present invention, it is possible to provide a waterproof pressure sensor capable of preventing protrusion of a gel agent and simplifying manufacturing steps, a manufacturing method for the waterproof pressure sensor, and a conveyance body.

DESCRIPTION OF THE PREFERRED EMBODIMENTS

Figure 1:
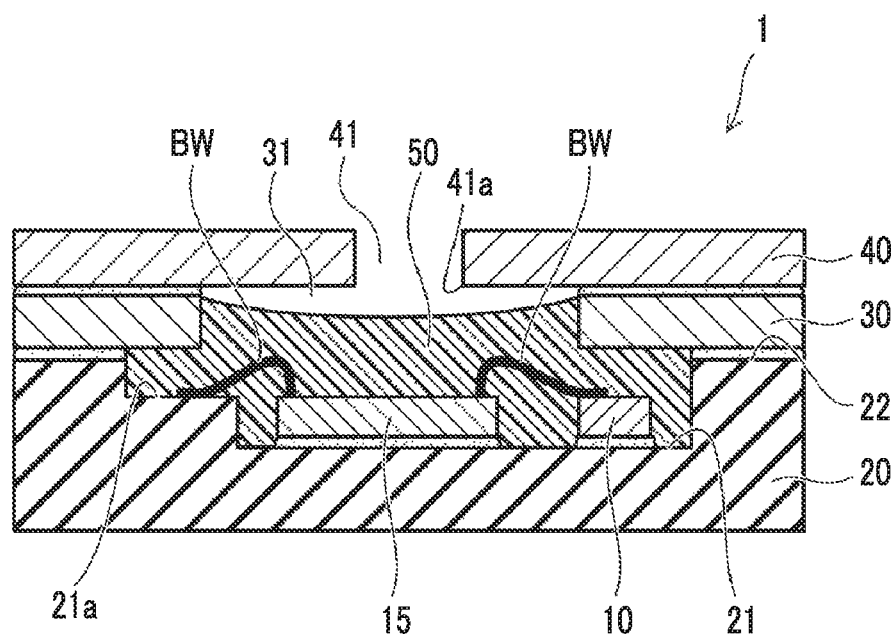
FIG. 1 is a sectional view exemplifying a waterproof pressure sensor according to a first embodiment.

Hereinafter, embodiments of the present invention will be described with reference to the drawings. In the following description, the same members are given the same reference numerals, and members described once will not be described as appropriate.

First Embodiment

Figure 2A:
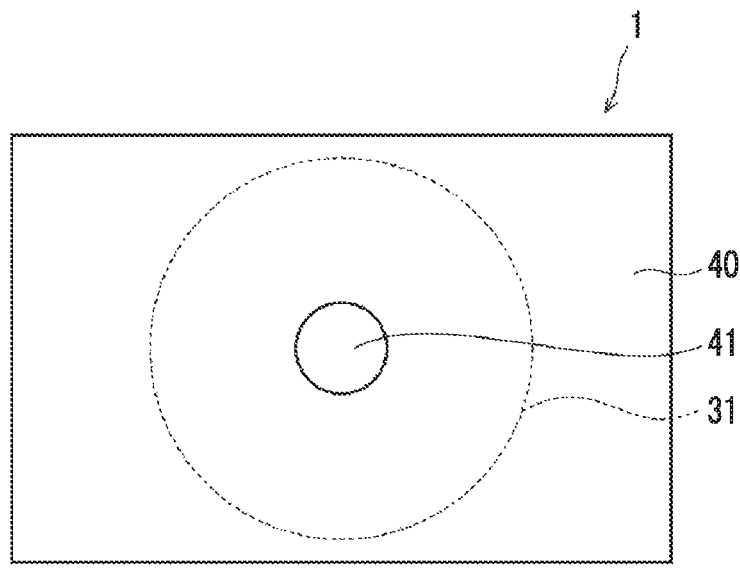
FIGS. 2A and 2B are plan views exemplifying the waterproof pressure sensor according to the first embodiment.
Figure 2B:
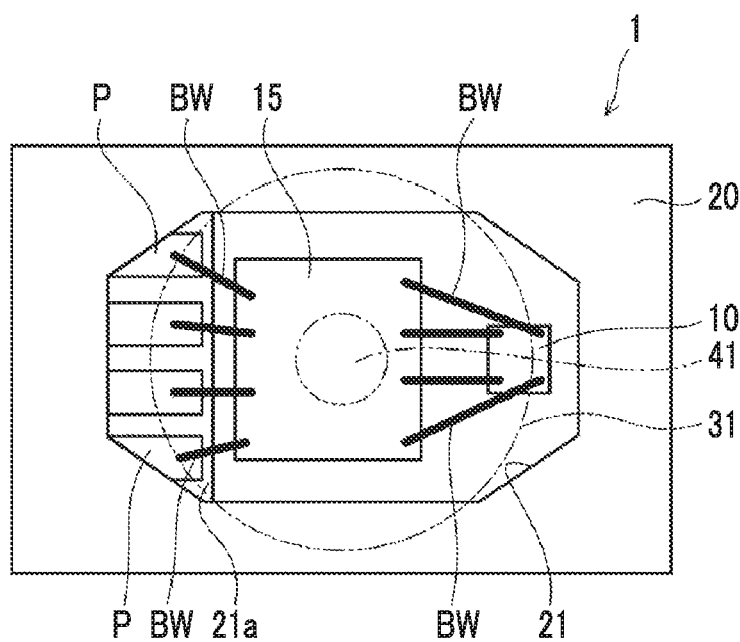

FIG. 1 is a sectional view exemplifying a waterproof pressure sensor according to a first embodiment. FIGS. 2A and 2B are plan views exemplifying the waterproof pressure sensor according to the first embodiment. FIG. 2A is a plan view in a state in which a contact prevention member 40 is provided, and FIG. 2B is a plan view in a state in which the contact prevention member 40 is not provided.

A waterproof pressure sensor 1 according to the present embodiment is a sensor detecting applied sensor with a pressure detection element 10, and has a waterproof function by covering a periphery of the pressure detection element 10 with a gel agent 50.

The waterproof pressure sensor 1 includes the pressure detection element 10, a cavity package 20, a frame 30, the contact prevention member 40, and the gel agent 50. The pressure detection element 10 is, for example, a chip component in which a diaphragm is formed in a semiconductor such as silicon through etching.

The cavity package 20 includes a recess 21 on which the pressure detection element 10 is mounted, and an edge 22 provided around the recess 21. The cavity package 20 is made of, for example, ceramics such as alumina. Metalized patterns P are formed on a step difference portion 21a or the like of the recess 21. In the present embodiment, in addition to the pressure detection element 10, a circuit element 15 is also mounted in the recess 21. Bonding wires BW are connected to the pressure detection element 10 and the circuit element 15, and thus the elements are connected to each other or connected to the metalized patterns P.

The frame 30 is attached onto the edge 22 of the cavity package 20 via an adhesive. A surface of the frame 30 is more smoothed than a surface of the edge 22. As an unlimited example, a roughness of the surface of the frame 30 is within a range of 0.6 μm to 15 μm in terms of the arithmetic average roughness Ra defined in JIS B0601:2001. As mentioned above, since the surface of the frame 30 is smoothed, a material forming the gel agent 50 is hardly wet-spread on the surface of the frame 30 in a manufacturing process of the waterproof pressure sensor 1. For example stainless steel or plastic is used for the frame 30. An opening 31 is provided at the center of the frame 30. A shape of the opening 31 in a plan view is preferably a polygonal shape or a circular shape. Here, the plan view indicates a state of a plane which is viewed from a direction orthogonal to the mounting surface of the pressure detection element 10.

Since the shape of the opening 31 in a plan view is a polygonal shape or a circular shape, when a liquid agent serving as the gel agent 50 is injected from the opening 31, the liquid agent radially spreads from the injection position in the recess 21, and thus entrapment of air can be prevented.

The outer shape (refer to a dashed line in FIG. 2A and a two-dot chain line in FIG. 2B) of the opening 31 in a plan view is located outside vertices of loops of the bonding wires BW connected to the components (the pressure detection element 10 and the circuit element 15) mounted in the recess 21. In other words, the vertices of the loops of the bonding wires BW are disposed inside the opening 31. Consequently, when the frame 30 is attached onto the edge 22, interference between the loops of the bonding wires BW and the frame 30 can be prevented. Therefore, a height of the edge 22 can be reduced, and thus it is possible to reduce the entire height.

The contact prevention member 40 is attached onto the frame 30 via an adhesive. For example, ceramics are used for the contact prevention member 40 in the same manner as for the cavity package 20. A pressure introducing hole 41 is provided at the substantially center of the contact prevention member 40. A diameter of the pressure introducing hole 41 is smaller than a diameter of the opening 31. The pressure introducing hole 41 is disposed at a position overlapping the opening 31 in a state in which the contact prevention member 40 is attached onto the frame 30.

The gel agent 50 is provided in the recess 21 and the opening 31. In other words, the gel agent 50 fills the recess 21 and the opening 31 so as to cover the pressure detection element 10 and the circuit element 15 mounted in the recess 21 and the bonding wires BW. For example, a fluorine gel or silicone gel is used for the gel agent 50.

In the waterproof pressure sensor 1 having the configuration, the gel agent 50 is provided to be separated from an edge 41a of the pressure introducing hole 41 on the frame 30 side (lower side). In other words, the gel agent 50 does not enter the pressure introducing hole 41.

Figure 3A:
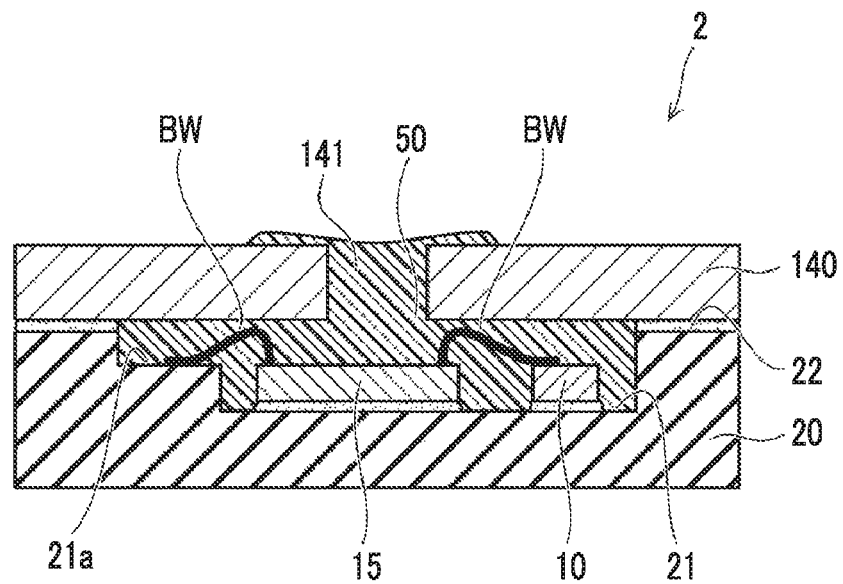
FIGS. 3A and 3B are sectional views exemplifying a state of a gel agent.
Figure 3B:
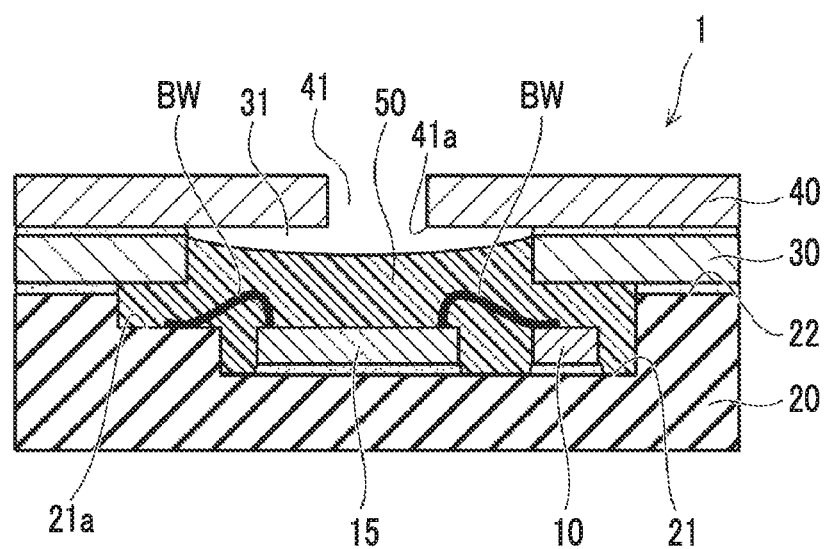

FIGS. 3A and 3B are sectional views exemplifying states of the gel agent. FIG. 3A exemplifies a waterproof pressure sensor 2 according to a reference example, and FIG. 3B exemplifies the waterproof pressure sensor 1 according to the present embodiment.

In both of the waterproof pressure sensor 2 according to the reference example illustrated in FIG. 3A and the waterproof pressure sensor 1 according to the present embodiment illustrated in FIG. 3B, the gel agent 50 covers the pressure detection element 10, the circuit element 15, and the bonding wires BW. However, in the waterproof pressure sensor 2 according to the reference example, a lid 140 is attached to the cavity package 20 via an adhesive. Thus, the gel agent 50 is located so as to fill a space formed by the recess 21 and a surface of the lid 140 facing the recess 21, specifically, so as to be in contact with the surface of the lid 140 facing the recess 21. The gel agent 50 overflows out of a pressure introducing hole 141 of the lid 140 and thus protrudes to the surface of the lid 140. Thus, there is concern that the waterproof pressure sensor 2 according to the reference example may be adhered to other members (for example, a cover film used together with an embossed tape accommodating the waterproof pressure sensor) via the gel agent 50.

On the other hand, in the waterproof pressure sensor 1 according to the present embodiment, the gel agent 50 is separated from the lower edge 41a of the pressure introducing hole 41, and thus does not overflow out of the pressure introducing hole 41 of the contact prevention member 40. Thus, the waterproof pressure sensor 1 according to the present embodiment has no concern about being adhered to other members via the gel agent 50.

As mentioned above, in the waterproof pressure sensor 1 according to the present embodiment, the gel agent 50 does not protrude to the outside of the contact prevention member 40, the waterproof pressure sensor 1 can be handled well without being hindered by the gel agent 50 when the waterproof pressure sensor 1 is picked up or is stored.

In the waterproof pressure sensor 1 according to the present embodiment, the contact portion of the gel agent 50 with air is located at the opening 31, and thus an area equivalent to an area of the opening 31 in a plan view is an area of a pressure sensing portion of the gel agent 50. In contrast, in the waterproof pressure sensor 2 according to the reference example, as illustrated in FIG. 3A, in a case where the gel agent 50 overflows out of the lid 140, an area equivalent to an area of the pressure introducing hole 141 of the lid 140 in a plan view is an area of a pressure sensing portion of the gel agent 50, and this area is smaller than the area in the waterproof pressure sensor 1 according to the present embodiment. Therefore, the waterproof pressure sensor 1 according to the present embodiment is expected to have higher external pressure sensitivity than the waterproof pressure sensor 2.

Method Manufacturing for Waterproof Pressure Sensor

Figure 4A:
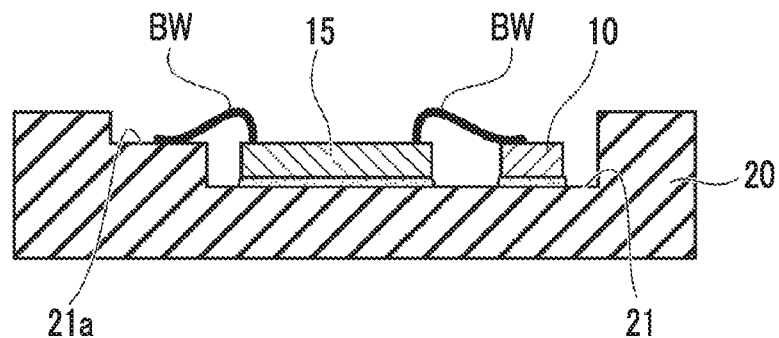
FIGS. 4A to 4C are sectional views exemplifying a manufacturing method for the waterproof pressure sensor according to the present embodiment.

FIGS. 4A to 5C are sectional views exemplifying a manufacturing method for the waterproof pressure sensor according to the present embodiment. First, as illustrated in FIG. 4A, the cavity package 20 with the recess 21 is prepared, and the pressure detection element 10 and the circuit element 15 are mounted in the recess 21. The pressure detection element 10 and the circuit element 15 are fixed to a mounting surface of the recess 21 via, for example, a die bond resin.

Next, the bonding wires BW are wired. The bonding wires BW are wired between the circuit element 15 and the metalized patterns P (refer to FIG. 2B) or between the circuit element 15 and the pressure detection element 10.

Figure 4B:
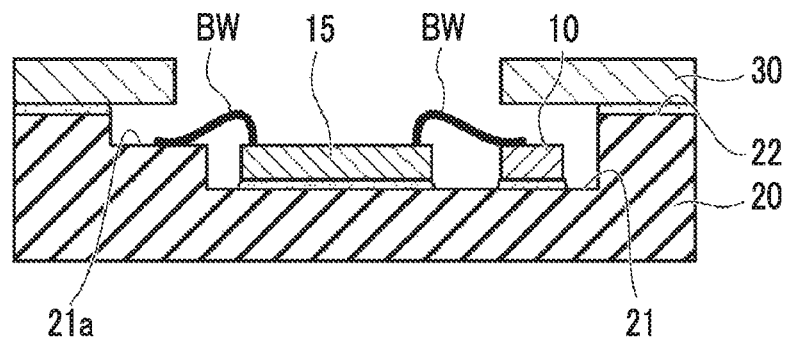
Figure 4C:
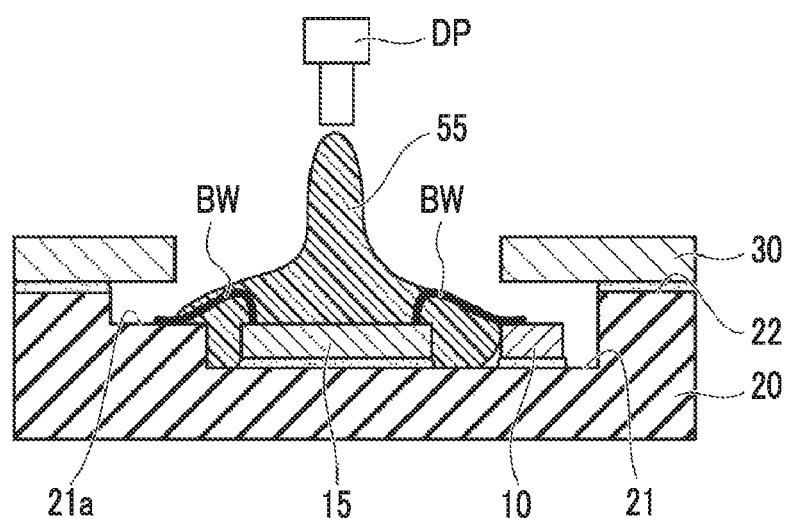

Next, as illustrated in FIG. 4B, the frame 30 is attached onto the edge 22 of the cavity package 20. The frame 30 is connected to the edge 22 via an adhesive. Next, as illustrated in FIG. 4C, a liquid agent 55 serving as the gel agent 50 is injected from the opening 31 of the frame 30. The liquid agent 55 is injected into the recess 21 from the opening 31 by using, for example, a dispenser DP. At this time, the liquid agent 55 is preferably injected into the recess 21 from the center of the opening 31. Consequently, the liquid agent 55 radially spreads from the injection position in the recess 21, and thus entrapment of air can be prevented. In a case of manufacturing the waterproof pressure sensor 2 according to the reference example illustrated in FIG. 3A, since the liquid agent 55 is injected into a space formed by the recess 21 and the surface of the lid 140 facing the recess 21 from the pressure introducing hole 141 of the lid 140, a gas in the space is hardly exhausted, and thus entrapment of air easily occurs.

If extension directions of the bonding wires BW in a plan view are set to directions which are not orthogonal to a radial direction from the center of the opening 31 when the bonding wires BW are wired, the liquid agent 55 easily flows along the bonding wires BW when the liquid agent 55 is injected. Consequently, it is possible to prevent air from being entrapped by the liquid agent 55.

Figure 5A:
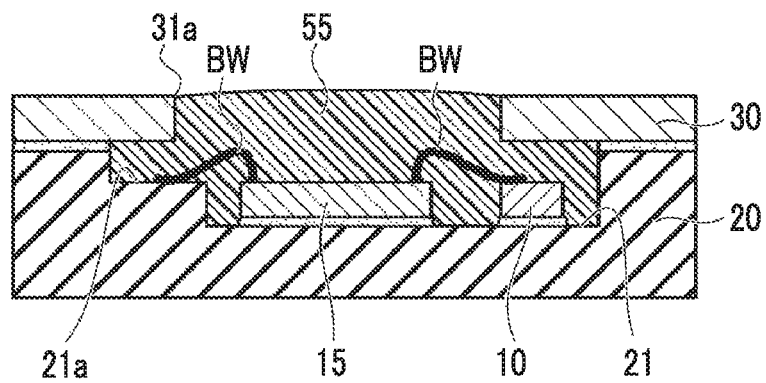
FIGS. 5A to 5C are sectional views exemplifying a manufacturing method for the waterproof pressure sensor according to the present embodiment.

FIG. 5A illustrates a state in which the recess 21 and the opening 31 are filled with the liquid agent 55. The liquid agent 55 fills the recess 21, and also fills a position of an upper edge 31a of the opening 31. As described above, since the surface of the frame 30 is smoothed, the liquid agent 55 is hardly wet-spread on the surface of the frame 30 in the state illustrated in FIG. 5A and in the subsequent process of curing the liquid agent 55.

Figure 5B:
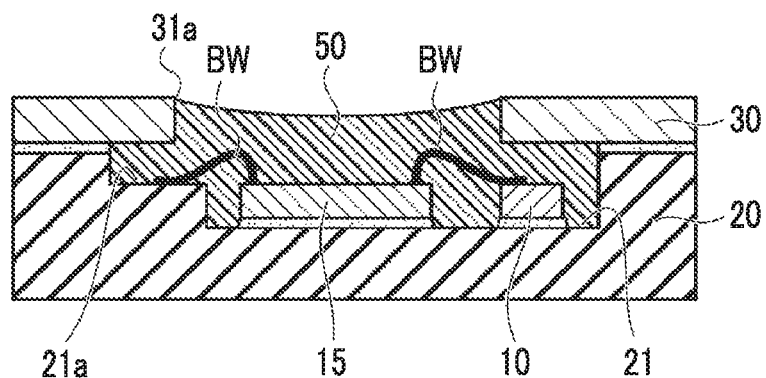

Next, as illustrated in FIG. 5B, the gel agent 50 is formed by curing the liquid agent 55. If the liquid agent 55 is gelled, a position of a surface of the gel agent 50 is slightly lower than a position of the upper edge 31a of the opening 31.

Figure 5C:
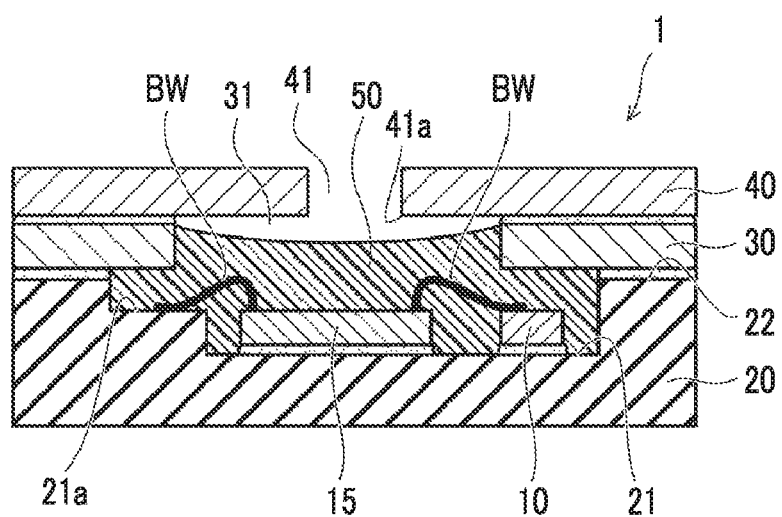

Next, as illustrated in FIG. 5C, the contact prevention member 40 is attached onto the frame 30. The contact prevention member 40 is connected to the frame 30 via an adhesive. Since the surface of the gel agent 50 is slightly depressed from the upper edge 31a of the opening 31 when the liquid agent 55 is gelled, a gap is formed between the gel agent 50 and the edge 41a on the frame side of the pressure introducing hole 41 of the contact prevention member 40. Consequently, the waterproof pressure sensor 1 is completed.

According to the manufacturing method, since the contact prevention member 40 is attached after the gel agent 50 is formed in the recess 21 and the opening 31, the gel agent 50 is stably prevented from protruding to the surface of the waterproof pressure sensor 1, and thus it is possible to prevent the inconvenience that the gel agent 50 comes into contact with other members other than the waterproof pressure sensor 1.

Figure 6A:
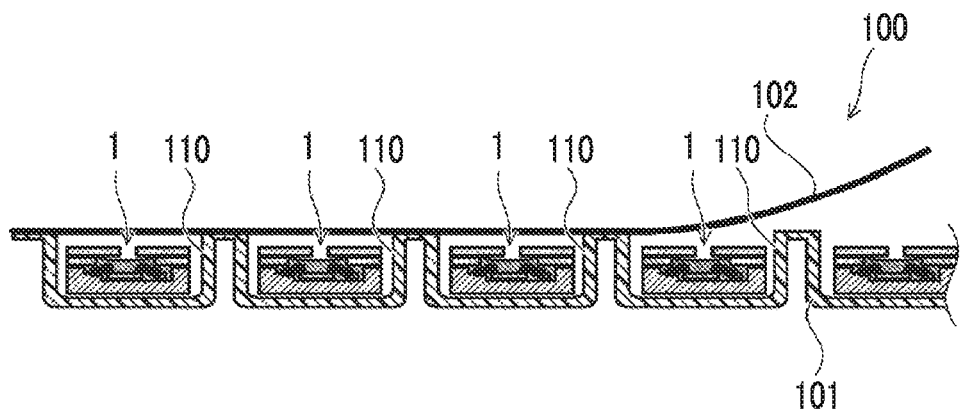
FIGS. 6A and 6B are schematic diagrams exemplifying a conveyance body storing the waterproof pressure sensor.
Figure 6B:
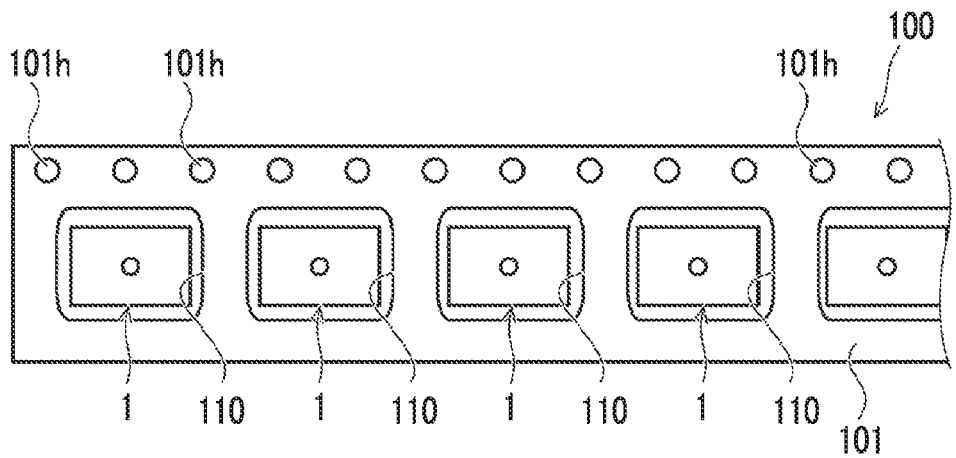

FIGS. 6A and 6B are schematic diagrams exemplifying a conveyance body storing the waterproof pressure sensor. FIG. 6A is a sectional view illustrating a state in which the waterproof pressure sensor 1 is stored in an embossed tape 100, and FIG. 6B is a plan view illustrating a state in which the waterproof pressure sensor 1 is stored in the embossed tape 100.

The embossed tape 100 includes a first tape (first member) 101 having a plurality of depressions 110 arranged in a length direction, and a second tape (second member) 102 which is bonded to the first tape 101 so as to be peeled off therefrom and covers the depressions 110. A plurality of feeding holes 101h are provided at an edge portion of the first tape 101 with a predetermined pitch along the length direction.

The second tape 102 is attached to the second tape 102 in a state in which the waterproof pressure sensors 1 are stored in the depressions 110, and thus a conveyance body is formed. When the waterproof pressure sensor 1 is stored in the depression 110, the surface of the waterproof pressure sensor 1 is adsorbed and held with, for example, a vacuum chuck, and adsorption is canceled after the waterproof pressure sensor 1 is disposed in the depression 110.

The embossed tape 100 in which the waterproof pressure sensor 1 is stored in the depression 110, and the second tape 102 is bonded thereto is conveyed as a conveyance body wound in a roll form as necessary. When the waterproof pressure sensor 1 is extracted from the embossed tape 100, the second tape 102 is peeled off from the first tape 101, the waterproof pressure sensor 1 is adsorbed and held with, for example, a vacuum chuck, so as to be extracted from the depression 110, and is mounted on a board or the like.

As mentioned above, the waterproof pressure sensor 1 is conveyed as a conveyance body by the embossed tape 100, and is unpacked to be mounted by a mounting machine. At this time, if the gel agent 50 is adhered to the surface (the surface of the contact prevention member 40) of the waterproof pressure sensor 1, this hinders a vacuum chuck from adsorbing and holding the waterproof pressure sensor 1. When the waterproof pressure sensor 1 is conveyed by the embossed tape 100, the gel agent 50 comes into contact with the second tape 102 due to vibration or the like during conveyance, and thus the second tape 102 is stuck to the second tape 102.

In the waterproof pressure sensor 1 of the present embodiment, since the gel agent 50 does not protrude to the surface of the contact prevention member 40, the surface of the contact prevention member 40 can be reliably adsorbed and held with a vacuum chuck. During conveyance using the embossed tape 100, the gel agent 50 does not come into contact with the second tape 102, and thus the waterproof pressure sensor 1 is not stuck to the second tape 102. Therefore, the waterproof pressure sensor 1 can be handled well.

Second Embodiment

Figure 7:
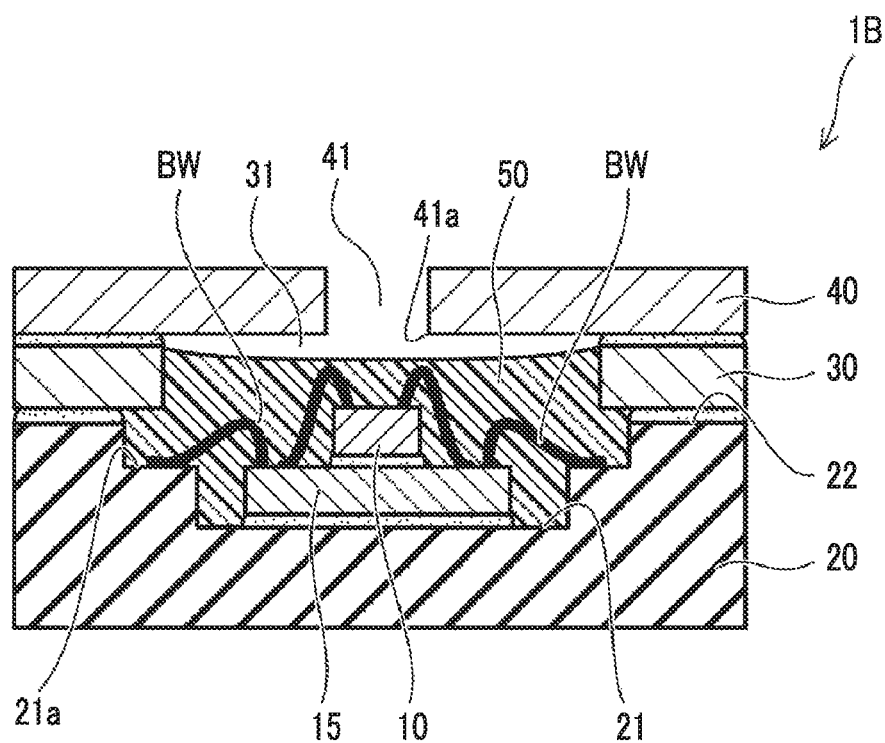
FIG. 7 is a sectional view exemplifying a waterproof pressure sensor according to a second embodiment.

FIG. 7 is a sectional view exemplifying a waterproof pressure sensor according to a second embodiment.

In a waterproof pressure sensor 1B according to the present embodiment, the pressure detection element 10 overlaps the circuit element 15 in the recess 21 of the cavity package 20. If the pressure detection element 10 overlaps the circuit element 15, it is possible to miniaturize the waterproof pressure sensor 1B in a plan view. In the present embodiment, the pressure detection element 10 is disposed inside the opening 31 of the frame 30, and thus it is possible to realize a reduction in height even if the pressure detection element 10 overlaps the circuit element 15.

Third Embodiment

Figure 8:
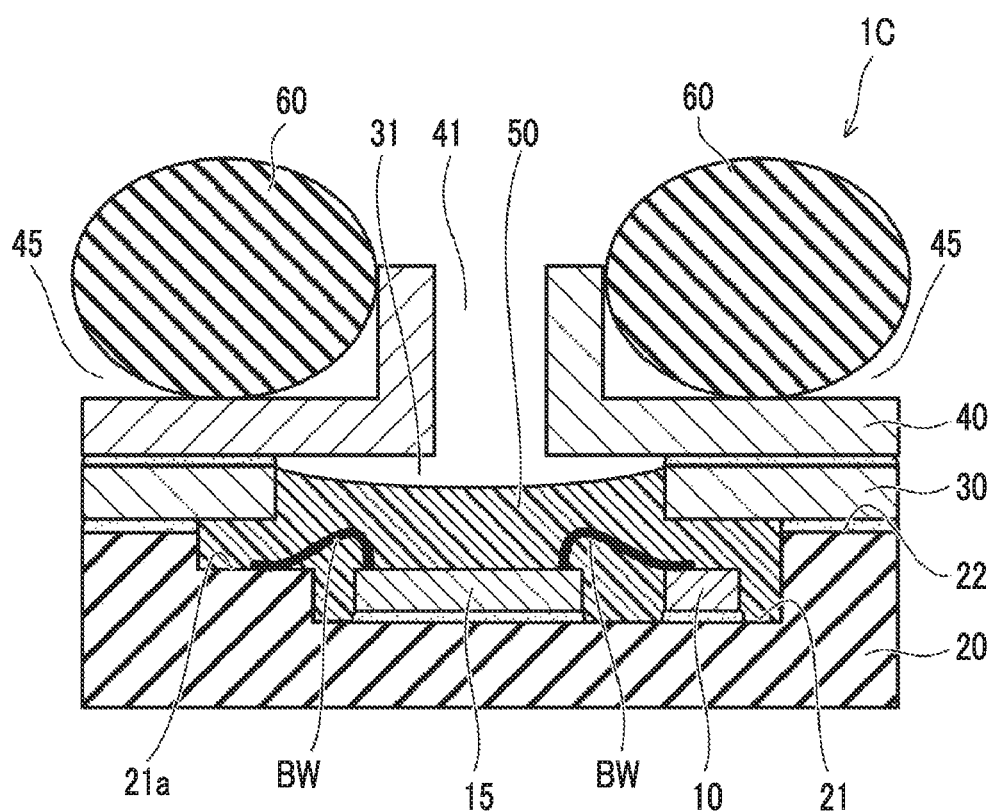
FIG. 8 is a sectional view exemplifying a waterproof pressure sensor according to a third embodiment.

FIG. 8 is a sectional view exemplifying a waterproof pressure sensor according to a third embodiment.

In a waterproof pressure sensor 1C according to the present embodiment, a space 45 for incorporating a seal member 60 is provided in the contact prevention member 40. The seal member 60 is, for example, an O ring or a packing. In the waterproof pressure sensors 1, 1B and 1C according to the embodiments, the pressure introducing hole 41 having a diameter smaller than a diameter of the opening 31, and thus a wide space for providing the seal member 60 is provided on the periphery of the pressure introducing hole 41 of the contact prevention member 40. In the waterproof pressure sensor 1C, since the space 45 for incorporating the seal member 60 is provided in the contact prevention member 40, a separate component is not prepared when the seal member 60 is attached to the contact prevention member 40, and the seal member 60 can be simply and easily attached.

As described above, according to the embodiments, it is possible to provide the waterproof pressure sensors 1, 1B and 1C and the manufacturing method therefor, capable of preventing protrusion of the gel agent 50 and simplifying manufacturing steps.

The present embodiments have been described above, but the present invention is not limited to such embodiments. Embodiments obtained by a person skilled in the art adding or deleting constituent elements to or from the above-described embodiments, or modifying design of the above-described embodiments, or embodiments obtained by combining the features of the configuration examples of the respective embodiments with each other as appropriate are all included in the scope of the present invention without departing from the spirit of the present invention.

It should be understood by those skilled in the art that various modifications, combinations, sub-combinations and alterations may occur depending on design requirements and other factors insofar as they are within the scope of the appended claims of the equivalents thereof.

What is claimed is:
1. A waterproof pressure sensor comprising:
a pressure detection element;
a cavity package having a recess in which the pressure detection element is mounted, and an edge portion surrounding the recess;

a frame attached to the edge portion of the cavity package, the frame having an opening above the recess, and a surface which is more smoothed than a surface of the edge portion;

a contact prevention member attached to the frame, the contact prevention member having a pressure introducing hole provided above the opening, the pressure introducing hole having a diameter smaller than a diameter of the opening; and a gel agent provided in the recess and the opening, wherein the gel agent is separated from a lower edge of the pressure introducing hole on the frame side.

2. The waterproof pressure sensor according to claim 1, wherein a shape of the opening in a plan view is a polygonal shape or a circular shape.

3. The waterproof pressure sensor according to claim 1, further comprising a component mounted in the recess, the component having a bonding wire connected thereto, wherein a vertex of a loop of the bonding wire is disposed inside the opening in a plan view.

4. The waterproof pressure sensor according to claim 3, wherein the bonding wire in a plan view extends in a direction which is not orthogonal to a radial direction from the center of the opening.

5. The waterproof pressure sensor according to claim 1, wherein a material of the cavity package is a ceramic.

6. The waterproof pressure sensor according to claim 1, further comprising:

a circuit element connected to the pressure detection element, wherein the pressure detection element is mounted on the circuit element.

7. The waterproof pressure sensor according to claim 1, wherein the gel agent has an air-contacting upper surface having an area equivalent to an area of the opening, thereby providing a pressure sensing area greater than an area of the pressure introducing hole.

8. A method of manufacturing a waterproof pressure sensor, comprising:

providing a cavity package having a recess and an edge portion surrounding the recess;

mounting a pressure detection element in the recess of the cavity package;

attaching a frame to the edge portion of the cavity package, the frame having an opening above the recess, and a surface more smoothed than a surface of the edge portion;

injecting a liquid agent into the recess through the opening of the frame so as to fill the recess and come into the opening;

gelling the liquid agent into a gel agent; and attaching a contact prevention member having a pressure introducing hole to the frame such that the pressure introducing hole is disposed above the opening, the pressure introducing hole having a diameter smaller than a diameter of the opening.

9. The method of manufacturing a waterproof pressure sensor according to claim 8, wherein in the injecting the liquid agent into the recess, the liquid agent is injected from a center of the opening.

10. A conveyance body for the waterproof pressure sensor according to claim 1, comprising:

a first member having a plurality of depressions arranged in a length direction thereof;

a plurality of the waterproof pressure sensors according to claim 1, each disposed in corresponding one of the plurality of the depressions; and a second member bonded to the first member so as to be peeled off therefrom, the second member covering the plurality of depressions.

11. The method of manufacturing a water proof pressure sensor according to claim 8, wherein in the injecting the liquid agent into the recess, the liquid agent also fills the opening of the flame to an upper edge thereof, and wherein, through the gelling the liquid agent into the gel agent, an upper surface of the gel agent becomes lower than the upper edge of the opening of the frame so as to form a gap between the upper surface of the gel agent and a lower edge of the pressure introducing hole of the contact prevention member.

12. The method of manufacturing a water proof pressure sensor according to claim 8, wherein, after the gelling of the liquid agent into the gel agent, the gel agent has an upper surface which contacts air, the upper surface having an area equivalent to an area of the opening, thereby providing a pressure sensing area greater than an area of the pressure introducing hole.

* * * * *